July 22, 1952 G. MATHEYS 2,603,950
HYDRAULIC SYSTEM FOR OBTAINING
AUTOMATIC MOTOR SPEED CONTROLS
Filed Feb. 17, 1948 7 Sheets-Sheet 1

INVENTOR
GASTON MATHEYS
BY

July 22, 1952 — G. MATHEYS — 2,603,950
HYDRAULIC SYSTEM FOR OBTAINING AUTOMATIC MOTOR SPEED CONTROLS
Filed Feb. 17, 1948 — 7 Sheets-Sheet 2

INVENTOR.
GASTON MATHEYS

INVENTOR.
GASTON MATHEYS

INVENTOR.
GASTON MATHEYS

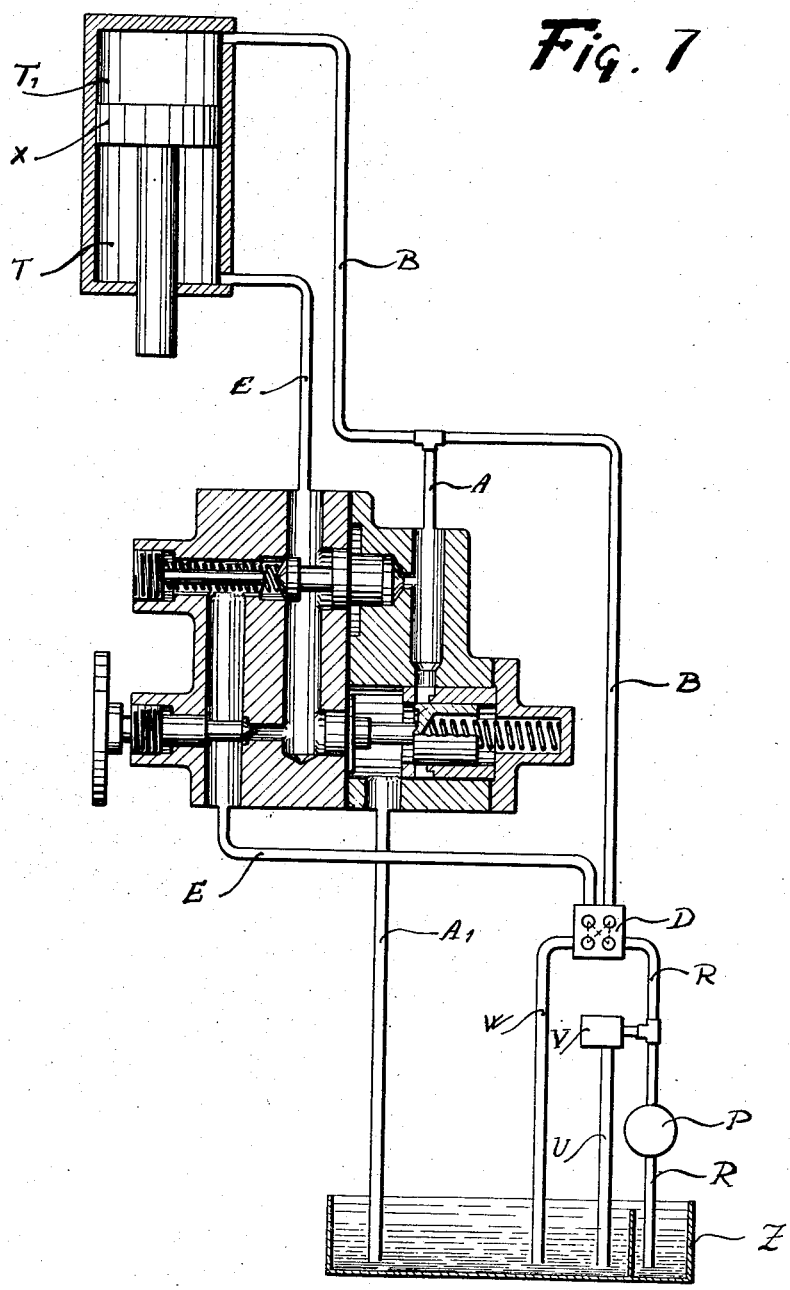

Patented July 22, 1952

2,603,950

UNITED STATES PATENT OFFICE 2,603,950

HYDRAULIC SYSTEM FOR OBTAINING AUTOMATIC MOTOR SPEED CONTROLS

Gaston Matheys, Brussels, Belgium

Application February 17, 1948, Serial No. 8,984
In Belgium February 19, 1947

7 Claims. (Cl. 60—52)

This invention relates to hydraulic and/or pneumatic regulators, particularly for tool machines, which show numerous advantages when compared with mechanical controls. Among other advantages softer movements, suppression of shocks, which are unavoidably brought about by gearings, even those with carefully finished surface, flexible control, simplicity in construction owing to the omission of complicated transmissions, precision and handiness, and last, in case it is rationally designed, a more economical cost than that of a mechanical regulator, may be mentioned.

In spite of all advantages inherent to the hydraulic control, its general use is not found in the past due to the requirements for the regulations of machine tools, which are particularly critical for drills, boring-machines, lathes and the like. These requirements may be stated as follows: The working and retraction speed for the tools must be sufficiently high (13 to 20 yards/min.) to reduce to a minimum any loss of time; control of the working speed of the operating tool with the utmost precision and particularly for a given speed in spite of the variableness of the importance of the tool, its number of revolutions/minute, as well as of the mechanical characteristics of the material to be worked.

Some known hydraulic regulators proposed to overcome these difficulties by using pumps at several stages, the output of which pumps varies in accordance with the use of complicated cams, rods, etc. Others use a whole net-work of conduits in balancing and compensating containers which are expensive and difficult to operate.

Still others, in order to secure precision in the working stroke, control the flow of the fluid by providing a valve in the conduit and using additional conduits from the source to a by-pass, which requires the application of particularly powerful motors for the operation of pumps, which must work continuously at highest pressure and capacity, even when the real power, produced in the servo-motor, is only absorbing a small part of it.

It is one object of the present invention to provide an automatic differential regulator for the speed transmission of hydraulic and/or pneumatic controls, particularly for machine tools, which comprises a feed conduit from the fluid source, and a return conduit connected to said feed conduit between a distributing and reversing valve and the working chamber of a servo-motor returning the fluid to said source, and a member connected with said return conduit and with the chamber of the servo-motor, a third conduit which connects the distributing and reversing valve with the other chamber of the servo-motor. The last mentioned member comprises a plurality of valves which are equipped with manually operated controls and operate automatically under the combined action of springs and of diaphragms subjected to pressure variations, occurring at the different operative stages in said conduits. During the approach of the motor piston toward the work under light load, said return conduit is closed while the feed conduit is completely opened so that the cylinder of the servo-motor receives the maximum output of the pump and so that the piston in the servo-motor and, thereby, the tool speed is as great as possible. In order to close said conduits during the working stroke, in a predetermined manner, so as to evacuate the excess of the fluid and to limit the feed towards the working chamber to the exactly required quantity, these conduits and their valve means provide the means for obtaining the most favorable speed for the piston and the tool, in accordance with the operating conditions. During the retraction of the piston; the said conduits are opened in full in order to evacuate, as rapidly as possible, the fluid contained in the cylinder of the servo-motor and to feed completely the chamber opposite the working chamber, in order to provide the greatest possible return speed of the tool.

It is another object of the present invention to confer to the tool an accelerated speed during its feeding stroke from the top down by means of a supplementary conduit leading from the working-chamber of the servo-motor, directly to the tank containing the fluid and a check-valve inserted in this supplementary conduit, which thus permits by opening of said check valve the direct feed of fluid to the working chamber, in order to compensate for the vacuum which appears when, during said feeding course, the tool and the piston of the servo-motor fall vertically at an accelerated speed, owing to the combined effect of their weight and the use of the full output of the pump, said speed being greater than the one corresponding to said full output.

It is a further object of the present invention to provide accelerated speed to the tool, during its feeding course, while moving in another than downward direction, by means of a compression spring disposed in the working chamber, the expansion action of which adds during said feeding course, to the action received from the full output of the pump, thus conferring to the tool and to the piston of the servo-motor, a greater speed than that which corresponds to the full output of the pump, whereby, the vaccum formed behind the piston of the servo-motor is then compensated by the fluid from its tank through the above mentioned supplementary conduit and its check-valve.

It is still another object of the present invention to provide in the servo-motor, in addition to its normal piston, a small piston which passes through the former, reciprocates in a second working-chamber, disposed in the hollow rod of the normal piston and separated from the normal working-chamber, a valve operating through a conduit connected with the second working-chamber, while a supplementary valve is associated with said first one, working under the combined action of a diaphragm and a piston, at the same time upon a conduit to the first working-chamber and upon a conduit leading from the supplementary valve to the fluid tank, in such a manner that during the feeding course of the tool, said supplementary valve is connected with the first working chamber and to the conduit connecting the supplementary valve to the tank, allowing thus the feed of fluid necessary to compensate the vacuum created by the normal piston, while going downwards at an accelerated speed, under the combined action of its own weight and the full output of the pump.

It is yet another object of the present invention to provide a variation of this last modification by inserting a compression spring in said first working chamber, so that its action adds to that of the full output of the fluid, in order to give the piston of the servo-motor and the tool, when moving in another direction than vertically down, during the feeding course, the required accelerated speed.

With these and other objects in view which will become apparent in the following detailed description, which discloses several examples of the present invention particularly adapted to an hydraulic and/or pneumatic regulator, as disclosed in the Belgian Patent No. 471,186, the present invention will be clearly understood in connection with the accompanying drawings, in which Figure 1 is a sectional elevation of one embodiment of the regulator;

Fig. 7 is a sectional elevation of the regulator together with the conduit system, substantially as shown in Fig. 2.

Figure 1:
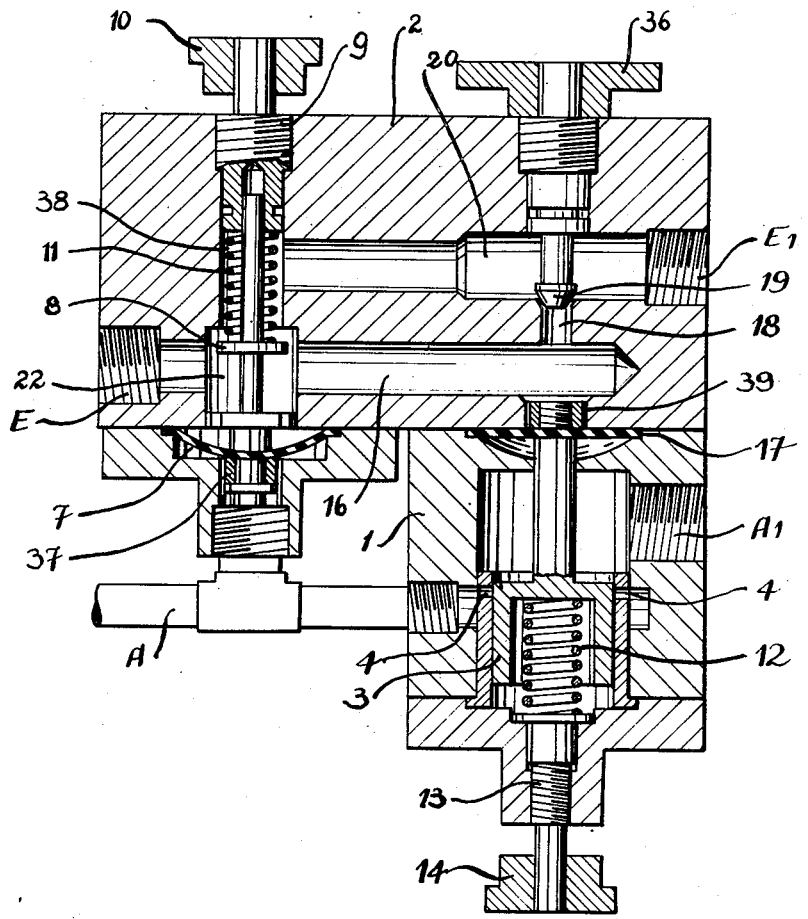
Figure 2:
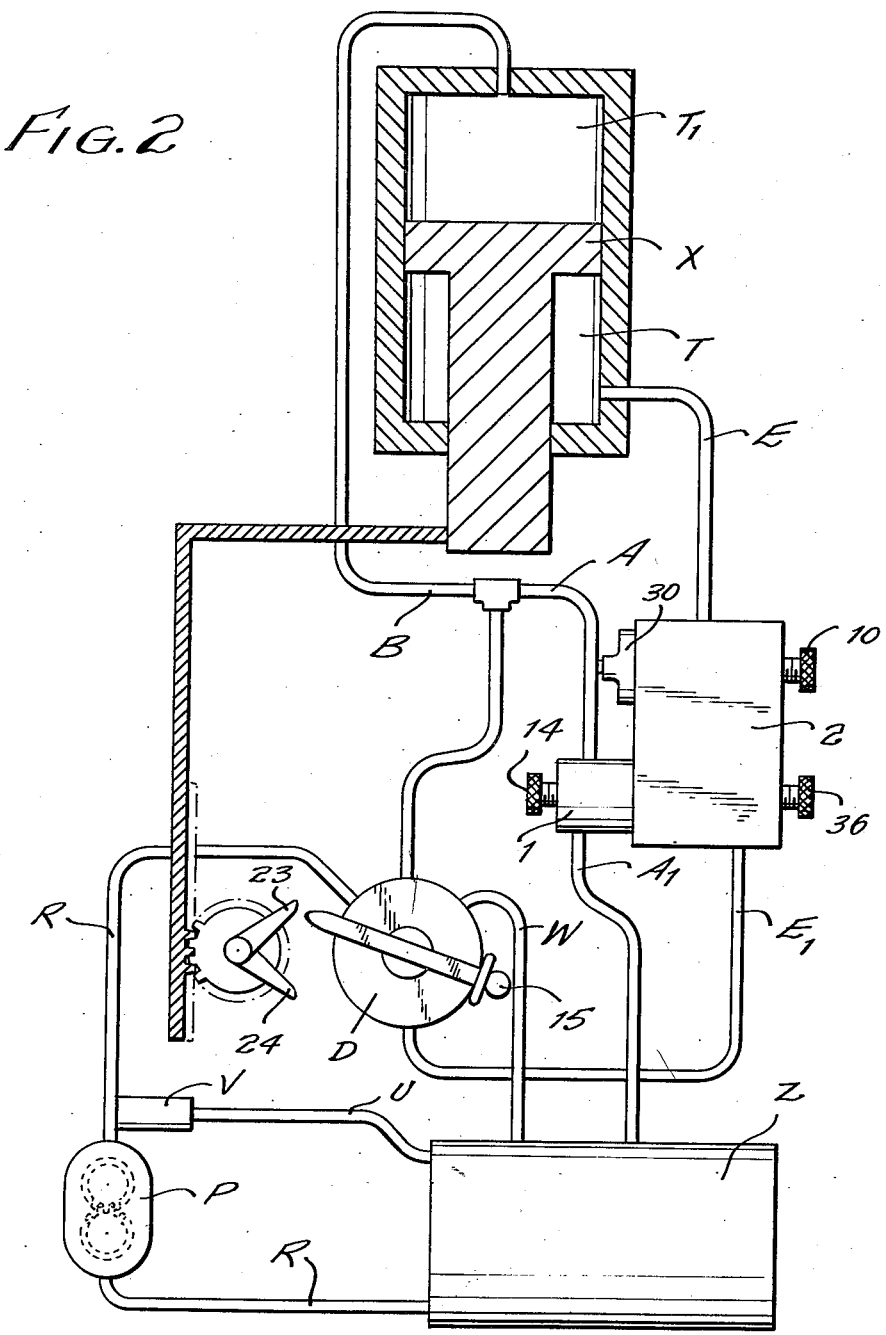
Figure 2 is a schematic diagram of the regulator, the servo-motor and their combination with the conduit system.

Referring now to the drawings and particularly to Figs. 1 and 2, the regulator in the first embodiment comprises a cylinder 1 receiving a piston valve 3, the rod of which carries a diaphragm 17, which by means of a spring 12, acting as static equalizer, presses against the corresponding wall of a body 2. This piston 3, due to its position which is determined and controlled by the diaphragm 17, closes circular slots 4 provided in the cylinder 1, thus connecting or disconnecting the conduits A and $A_1$, terminating in the cylinder 1. The conduit A is connected with the conduit B (Fig. 2), supplying the chamber $T_1$ of a servo-motor with fluid, while the conduit $A_1$ is connected with the fluid tank Z and serves the purpose of returning the fluid to the tank Z.

The body 2 contains a chamber 22, which receives one end of a conduit E, the other end of which terminates into the chamber T of the servo-motor. From the chamber 22 extends also a channel 16, as well as a channel 38, which in turn receives one end of a channel 20 the other end of which is connected with a conduit $E_1$ and thus with the distributing and reversing valve D. The chamber 22 is traversed by the valve 8 which is operated by a diaphragm 7, one face of which is subjected to the action of the fluid pressure prevailing in the conduit E and in the chamber 22, while its other face is subjected to the action of the fluid pressure prevailing in the conduit A.

A spring 11, disposed on the valve 8, the action of which is described below, maintains the diaphragm 7 in a position providing a complete opening of the valve 8, permitting free passage from the chamber 22 to the channel 38.

The channel 16 is equipped at the farther end from the chamber 22 with a slot 39 which communicates with the diaphragm 17 and a by-pass slot 18 disposed oppositely the slot 39, communicates with the channel 20. The slot 18 may be closed by means of the valve 19, operated by the handle 36.

The regulator works in the following manner:

When the distributing and reversing valve D is positioned to direct fluid to flow through the conduit B into the chamber $T_1$ of the servo-motor, this fluid operates the piston X thereof imparting to it a downward stroke (Fig. 2) and driving out the fluid contained in the chamber T of the servo-motor through the conduit E, the chamber 22 and the channels 38, 20 and conduit $E_1$.

A certain amount of fluid can escape through the conduit 16, and the slot 18, which the valve 19 opens to a predetermined extent. The piston X of the servo-motor encounters no resistance and is thus moving at a speed corresponding to the total capacity of the pump P. The pressure in the chamber 22 of the diaphragm 7 will, in view of the spring 11, maintain the diaphragm 7 and the valve 8 in a position of equilibrium as shown in Fig. 1, thus allowing the rapid discharge of the chamber T through the conduits E and the other channels connected thereto. Due to the fact that the flow of the fluid takes place freely, the pressure in the channel 16 is not sufficient to operate the diaphragm 17, and, thereby to move the piston valve 3, and thus the full output of the fluid provided by the pump P is used for exerting the stroke of the piston X of the servo-motor.

As soon as the piston X or the tool on which it is acting meets any resistance, the need for more power arrives. The pressure in the chamber $T_1$, the conduit B and in the conduit A increases and pushes the diaphragm 7 and the valve 8 to the right (Fig. 1), interrupting the connection between the chamber 22 and the channel 38 through the valve 8. The fluid released from the chamber T of the servo-motor can then only escape through the channel 16 and the slot 18 which is only partially closed by means of the valve 19, which was previously regulated by the knob 36 in such manner that the operating tool possesses the required speed for the best working conditions. The output of the pump remains however the same and the piston X has a tendency to reduce its initial speed; thus the pressure in the chamber T, the conduit E and the channel 16 increases proportionately to the resistance the fluid has to surmount in order to pass through the calibrated slot 18. This pressure is acting at the same time upon the diaphragm 17 and pushes it downwardly from the position illustrated in Fig. 1 and, thereby, also the piston 3, which opens the slots 4 establishing thus connection between the conduits A and $A_1$, so that a certain quantity of fluid passes through the thus created by-pass, reducing the pressure prevailing in the chamber $T_1$ and motion of the piston X, the stroke speed of which is hereafter reduced according to the amount of fluid escaping through the slot 18. The pressure prevailing in the chamber T, the conduit E and the channel 16 decreases consequently, which allows the compensation-spring 12, previously set according to the respective sections of the several conduits, to drive back the piston valve 3 and the diaphragm 17 to their initial positions, causing thus a closing of the by-pass slot 4, to a certain extent, depending upon the stroke speed of the piston X and the different effects resulting therefrom.

When, at the required moment, predetermined by the position given to the controlling organs 23 and 24 operated by the piston X (Fig. 2) the distributing and reversing valve D stops the working stroke of the piston X and starts retraction of the piston X, the fluid is caused to flow through the conduit $E_1$ to the channels 20 and 38, acts upon the corresponding face of the valve 8 and, cooperating with the spring 11, pushes the valve 8 and the diaphragm 7 back to the original position shown in Fig. 1, thus clearing the way for passage of the fluid into the chamber 22, the conduit E and the chamber T of the servo-motor. On the other hand, as in its opposite course, the piston X has to overcome the resistance of the fluid acting on the other face of the piston X. A certain pressure will occur in the chamber T of the servo-motor and in all conduits connected thereto, as well as in the channel 16, as result of which the diaphragm 17 will be pushed back; the diaphragm 17, operating on the piston valve 3, causes opening of the slots 4, thus allowing an additional amount of fluid to escape through the conduits A and $A_1$, and to accelerate the retraction of the piston X.

It is clear that if, during the working stroke of the piston X, the load would momentarily disappear, the rapid speed of the stroke would be automatically and immediately reestablished by the interference of the above described organs, and the contrary effect would also automatically appear as soon as the load would be felt again.

Figure 3:
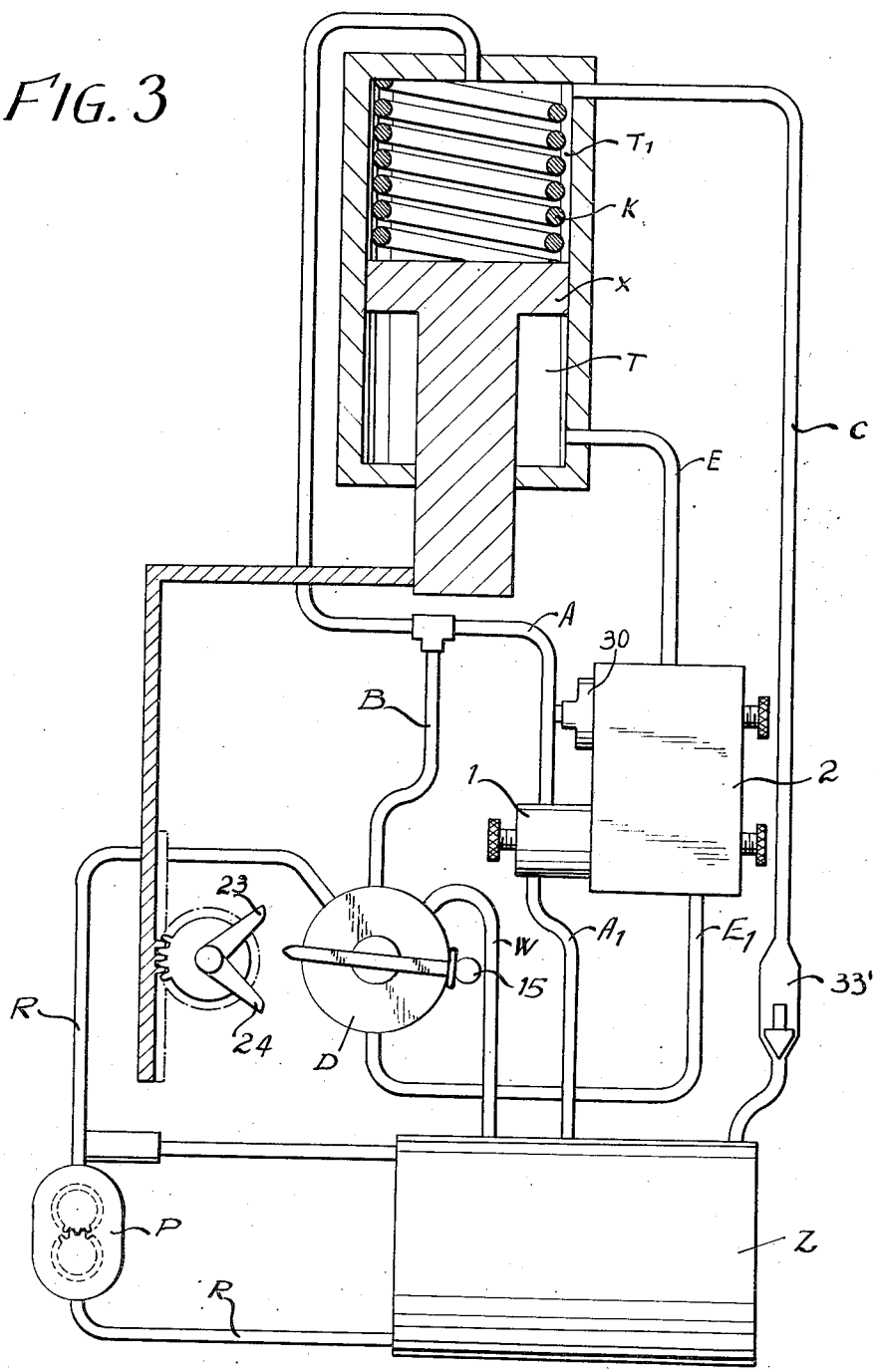
Fig. 3 is a variation of the schematic diagram shown in Fig. 2.

Fig. 3 represents a variation of the embodiment shown in Fig. 2, according to which it is possible to give to the tool and to the piston jointed thereto, during its rapid advance under no load, an accelerated speed which is greater than the one resulting from the maximum output of the pump P.

If this rapid advance under no load takes place from top to bottom, it will be sufficient to provide a supplementary conduit C (Fig. 3) which connects the working chamber $T_1$ of the servo-motor with the fluid tank Z in which case a check-valve 33' is inserted in this conduit C.

When the distributing and reversing valve D is positioned to direct flow of the fluid to the chamber $T_1$, through the conduit B, the chamber T communicates with the fluid removing conduits and the piston X is performing its downward stroke under the combined action of the fluid pressure, introduced by means of the conduit B and its own weight. The piston X passes in its rapid stroke a bigger volume than that which can be replaced by the fuel capacity of the pump, creating a vacuum which causes the opening of the check-valve 33' and allows thus the refilling from the tank Z through the conduit C, of the required fluid volume for the created vacuum space. Thus the feeding movement of the tool will automatically continue at a greater speed than that corresponding to the full capicity of the pump.

And in case the rapid advance under no load takes place in another than the downward direction, it will suffice to provide a compression spring K in the working chamber $T_1$ of the servo-motor, as shown in Fig. 3, the action of which spring pushes the piston X during its rapid advance under no load, adding its effect to that of the full capacity of the pump P, whereas the conduit C and its check valve 33' allow the feed of the fluid necessary to fill the vacuum, caused by the displacement of the piston X at an accelerated speed which displacement is greater than can be supplied by the fuel output of the pump P in the same time period.

Figure 4:
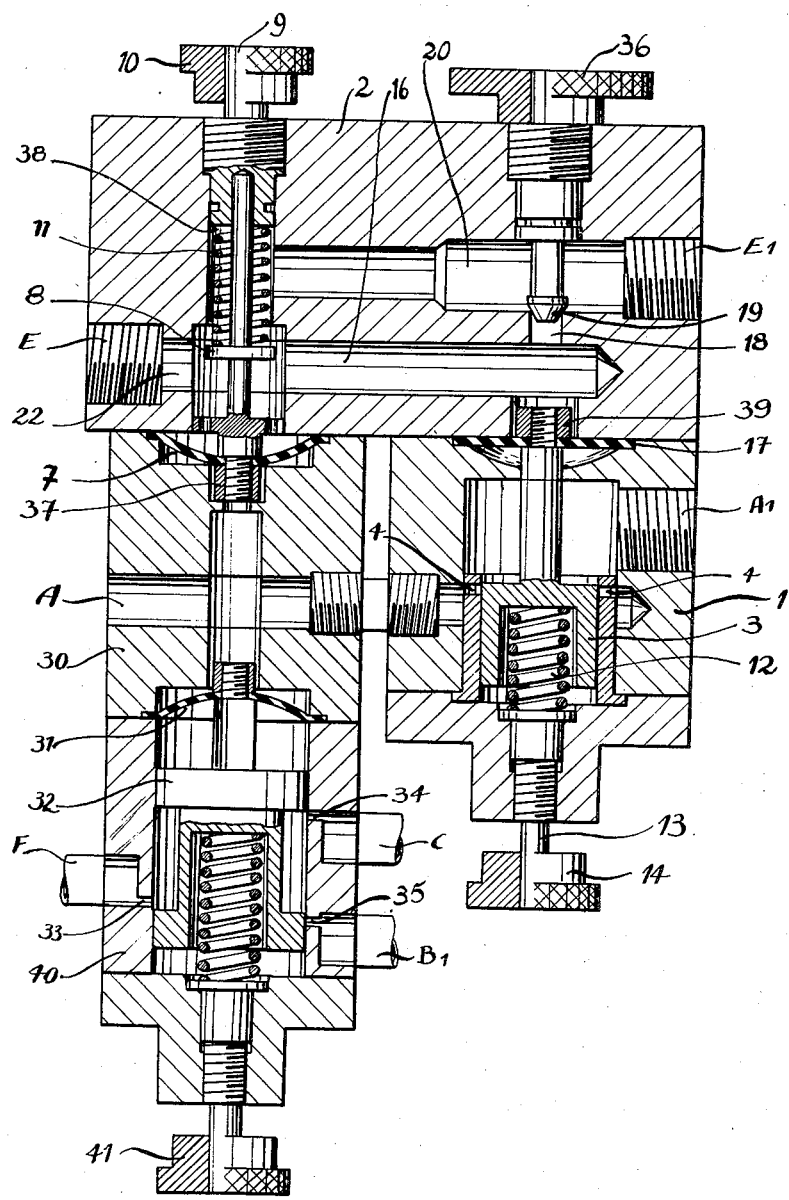
Fig. 4 is a sectional elevation of another embodiment of the regulator.
Figure 5:
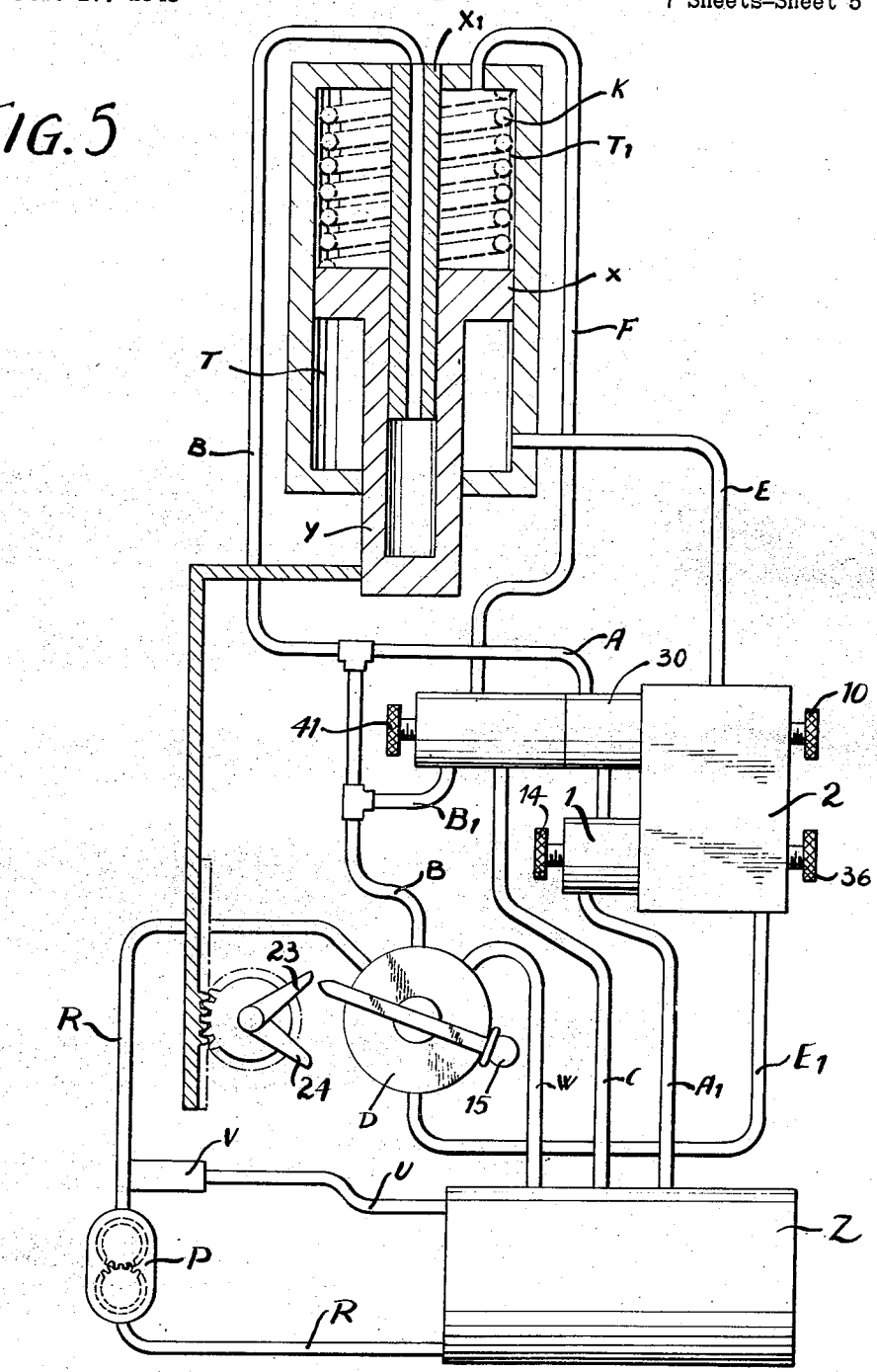
Fig. 5 is still another variation of the schematic diagram shown in Fig. 2.

The Figs. 4 and 5 represent another embodiment of the regulator in accordance with the invention, which permits of an accelerated speed for the tool during its rapid advance under no load superior to the one which can be achieved with the pump P working at full capacity. In this embodiment, the regulator of Fig. 1 is equipped with supplementary elements, and the conduit system disclosed in Fig. 2 is modified in the following manner:

A member 30 is added to the body 2, which member 30 has, in addition to diaphragm 7, a diaphragm 31 which operates piston valve 32, adapted to reciprocate in the cylinder 40, and connected on one side by means of the slot 33 with a conduit F, which terminates in the chamber $T_1$ of the servo-motor, and on the other side, respectively, by means of the slot 34 with a conduit C terminating in the fuel tank Z, and by means of the slot 35 with the conduit $B_1$, which provides connections with the conduit B. The slots 33, 34 and 35 can be alternatively opened or closed by means of the piston valve 32. The conduit A, connected with conduit B, passes through the member 30, so that the fluid flowing through the conduit A operates simultaneously both diaphragms 7 and 31 and terminates in the cylinder 1, as previously described.

The cylinder of the servo-motor contains, in addition to the piston X, a second piston X' which is received by the cylinder Y formed in the hollow rod of the piston X. The conduit B connects the hollow rod of the piston X' with the distributing and reversing valve D. If the piston X is disposed in such manner that its vertical downward course corresponds with the working stroke, it may, during its rapid advance under no load, obtain an accelerated speed, under the combined action of its own weight and of the full capacity of the pump P, in which case the spring K (Fig. 5) is not used. But, if the piston and the tool execute their rapid advance under no load in another than the downward direction, their weight does not accelerate the speed during rapid advance under no load; in that case the compression spring K pushes the piston X and the effect of the spring K, combined with the full output of the pump, gives the tool the required accelerated speed.

The working in both cases is as follows:

When the distributing and reversing valve D is positioned to direct the fluid to flow through the conduit B and the hollow piston X' into the cylinder Y, putting at the same time the chamber $T_1$ of the servo-motor in connection with the evacuation conduits, the piston X will move, under the combined action of the pressure of the fluid and its own weight, downwards at accelerated speed.

In case the piston and the tool move during their working stroke in another than downward direction, the spring K (Fig. 5) will substitute the force exerted by the weight of the piston X, which is used in the preceding variation, the fluid possessing at that moment a predetermined pressure in the conduit B and in the conduit A. The position of the diaphragms 7 and 31 is not changed, and the stroke of the piston X brings about a vacuum in the chamber $T_1$ which receives replacement of fluid through the conduit F, the slots 33 and 34 and the conduit C (Figs. 4 and 5). As soon as the piston X and the tool encounters any resistance, the pressure of the fluid increases rapidly in the chamber Y as well as in the conduit B and conduit A; since it exceeds the critical rate, at which the said diaphragms are retained in position it pushes back the diaphragm 7 and the diaphragm 31, the latter moving the piston valve 32, and thereby closing the slot 34 and opening the slot 35, and establishing the connection between the conduits F and $B_1$, which allows the fluid to enter the chamber $T_1$ and to operate on the surface of the piston X in the chamber $T_1$ as well as in the chamber Y. Upon connecting the pressure side of the pump P with the chamber $T_1$ the working stroke of the piston X is performed in the same manner as described in connection with the embodiment of Figs. 1 and 2.

When, at the end of the working stroke, the piston X is retracted, due to the position of the distributing and reversing valve D, the diaphragm 31 will again resume the position shown in Fig. 4, permitting the fluid to be discharged from the chamber $T_1$ owing to the retraction of the piston X, through the conduit F, the slots 33 and 34 and the conduit C to the tank Z.

During the working of the above described device, a certain pressure relation is established in the conduits A and E and the regularity of movement of the piston X depends on the said pressure relation.

This pressure relation is a function of the volume of the fluid escaping at a given moment through the slots 4, which are opened by the piston-valve 3, maintained in equilibrium by the action of the diaphragm 17, and of the spring 12.

It has been found that under certain conditions, sudden pressure variations of the fluid appear in the conduit A, for instance when the tool or drill peers out of the material, in consequence of which the fluid, escaping through the slots 4, may exert an action opposed to that of the diaphragm 17, and thus disturbs the equilibrium of the piston valve 3. The pressure relation between the conduits A and E will be therethrough changed and the movement of the tool consequently may be subjected to undesirable accelerations of speed.

In order to avoid and to remedy those undesirable effects, a servo-stabilizer is added to the above described differential regulator, with the purpose to maintain the piston-valve 3 in equilibrium, or to work upon it in opposite direction, in order to provide, according to the given circumstances, a retarding, an equilibrium or the acceleration of the piston X.

Figure 6:
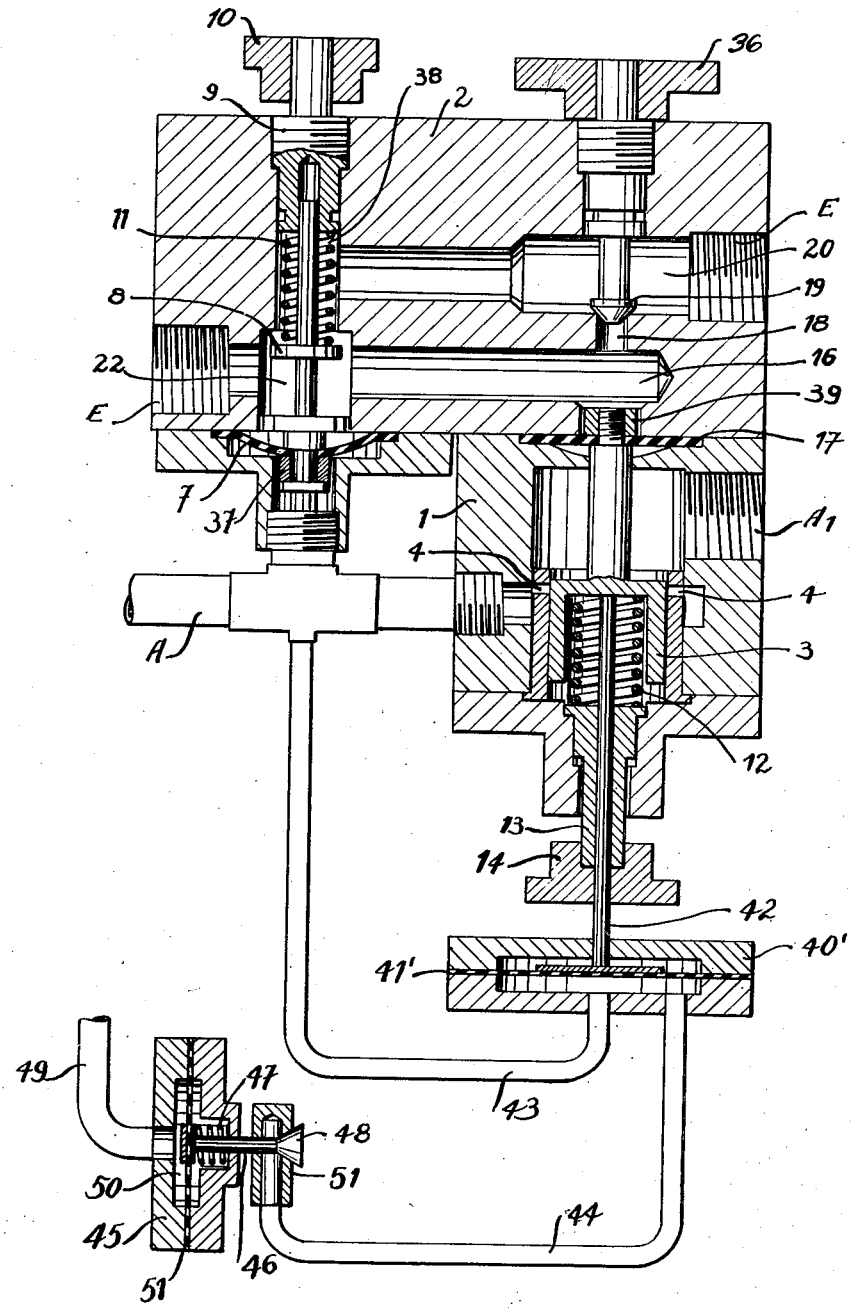
Fig. 6 is a sectional elevation of the embodiment of the regulator shown in Fig. 1 in connection with a servo-stabilizer.

Such servo-stabilizer is shown in Fig. 6 in an application to the embodiment of Fig. 1. It comprises a chamber or cylinder 40', communicating through the conduit 43 with the conduit A and containing a diaphragm 41' secured to a piston 42, the rod of which is secured to the back face of the piston-valve 3. On the other hand, a conduit 49 communicates with the conduit E, and terminates in a chamber 45, to which diaphragm 50 is secured, the rod 46 of which diaphragm 50 bears valve 48, adapted to close or to open slightly the outlet 51.

A spring 47 balances the diaphragm 50. Another conduit 44 connects the chamber 40' with the outlet 51 of the valve 48.

The pressure formed in the conduit A is found also in the chamber or cylinder 40' and thus received by the diaphragm 41', and transmitted by means of the rod 42 to the piston-valve 3.

In case the working of this pressure should surpass the combined action which, on the one hand, exerts on the diaphragm or piston 17 the pressure existing in the conduit E, and, on the other hand, the escapement of the fluid through the slots 4 exerts on the piston-valve 3, the latter will be caused to move so as to close the slots 4, which as a result, will increase the pressure in the conduit E, and consequently, alter the speed of the tool. But this pressure-increase in the conduit E is transmitted through the conduit 49 to the chamber or cylinder 45, where it acts upon the diaphragm 50, the rod 46 of which will cause the valve 48 to open the outlet 51. Consequently, the pressure existing in the chamber or cylinder 40' decreases, which allows the diaphragm 17 and the piston-valve 3, to open the slots 4, which will cause an appropriate pressure drop in the conduit E, which in turn causes the closing of the valve 48. In case that opposite effects should occur, that is to say in case of pressure drop in the conduit E, the intervenience of the different organs will equally take place in an opposite direction.

The modification shown in Fig. 7 operates substantially in the same manner as the device shown in Fig. 2 in conjunction with a regulator.

It must be understood that the above mentioned embodiments of the present invention are merely given as an example, and that they are not limiting its scope which includes also all other executions, such as for example, one in which the piston of the servomotor is stationary, while its cylinder is movable and secured to the tool-holder, or also the substitution of organs for those disclosed, as for instance, the replacement of a diaphragm by a gliding piston or vice-versa.

In the same way, the whole of the servo-stabilizer contained in the chamber or cylinder 45 may be completed or substituted by a system of manual regulation, as a needle valve, for instance. By opening said valve more or less, it is possible to accentuate or diminish the action of the diaphragm 41, maintaining thus the regulating piston 3 in the required equilibrium.

I claim:

1. An automatic differential hydraulic regulating device to act upon the volumetric admission of fluid under pressure in a servomotor, comprising a cylinder, a piston reciprocating in said cylinder, a fluid tank, a fluid pressure generator having constant volumetric output, a working fluid conduit leading from the said tank through the said generator to the working side of the said cylinder for feeding pressure fluid from said generator to the said cylinder, a fluid diverting conduit leading from the working end of said cylinder to the said tank, first valve means disposed in the said fluid diverting conduit and adapted to shut-off the latter, an exhaust fluid conduit leading from the exhaust side of the said cylinder to the said tank, second valve means disposed in the said exhaust fluid conduit and adapted to shut-off the latter, first means responsive above a predetermined pressure in the said exhaust fluid conduit for opening the said first valve means in the said fluid diverting conduit, and second means responsive above a predetermined pressure in the said fluid diverting conduit for closing the said second valve means in the said exhaust fluid conduit.

2. The device, as set forth in claim 1, which includes a manually set throttling device disposed in said exhaust fluid conduit in parallel arrangement with the said second valve means, thus permitting escape of exhaust fluid at a reduced predetermined volume upon closing the said second valve means.

3. An automatic differential hydraulic regulating device to act upon the volumetric admission of fluid under pressure in a hydraulic cylinder, comprising a cylinder adapted to receive fluid under pressure, a piston reciprocating in said cylinder, an exhaust conduit leading from said cylinder, a valve disposed in said exhaust line, a spring tending to maintain said valve in open position, said valve being adapted to shut off said exhaust conduit partially only, a first pressure-responsive actuator operating said valve against pressure of said spring in response to pressure variations in said cylinder, a manually set rigid throttling device disposed in said exhaust conduit, a chamber disposed in said exhaust conduit between the said cylinder and said throttling device, a second pressure-responsive actuator disposed in said chamber, a fluid pressure generator having constant volumetric output, a fluid admission conduit between the said fluid pressure generator and the said cylinder, a flow reversing device in said admission conduit, a fluid diverting conduit leading from the said admission conduit between the said cylinder and said reversing device, a movable piston valve disposed in said diverting conduit and operated by the said second actuator to act as by-pass for the working fluid, a spring tending to counterbalance the said piston valve against the said second actuator, the latter being responsive to pressure variations in the exhaust conduit.

4. An automatic differential hydraulic regulating device to act upon the volumetric admission of fluid under pressure in a hydraulic cylinder, comprising a cylinder adapted to receive fluid under pressure, a piston reciprocating in said cylinder and dividing the latter into a working chamber and an exhaust chamber, an exhaust conduit leading from the exhaust chamber of the said cylinder, a housing interposed in said exhaust conduit, a movable shut-off valve disposed in the said exhaust conduit, a rigid manually set throttling device disposed in the said exhaust conduit within the said housing, a first pressure-responsive actuator secured to the said shut-off valve to operate the latter, a spring disposed on the side of the said shut-off valve opposite to the said first actuator to exert a constant pressure on said valve to maintain the open position of said shut-off valve and to oppose the action of the working fluid pressure exerted against the said first actuator, a tank adapted to receive the fluid, a fluid pressure generator having constant volumetric output, a connecting conduit leading from the said tank to the said fluid pressure generator, a flow reversing device, the portion of the said exhaust conduit leading from the said housing connecting the said exhaust fluid outlet channel with the said reversing device, a further exhaust conduit leading from the said reversing device to the said fluid tank, a working fluid conduit leading from the said fluid pressure generator to the said reversing device and from the latter to the working chamber of the said cylinder, a fluid diverting conduit extending from the said working fluid conduit between the said cylinder and the said reversing device into the said housing, a working fluid channel disposed in the said housing and receiving the said fluid diverting conduit, a first working fluid exhaust chamber disposed in the said housing and the said working fluid channel of the latter leading into the said last-mentioned chamber, a sleeve inserted into the said last-mentioned chamber of the housing and having a circular groove, the said working fluid channel opening into the said circular groove, a movable piston valve sliding in the said sleeve, a second pressure-responsive actuator secured to the said piston valve to operate the latter, a back-pressure chamber opening upon the said second actuator and communicating with the said exhaust fluid inlet channel, a spring at the other end of the said movable piston valve adapted to exert a constant pressure upon the latter and to balance back-pressure variations in the said back-pressure chamber exerted against the said second actuator, a second working fluid exhaust chamber disposed in the said housing and surrounding the portion of the said sleeve having the said circular groove, the said piston valve permitting connection and disconnection, respectively, between the said first and said second working fluid chambers depending upon the position of the said piston valve in the said sleeve, a working fluid outlet channel extending from the said first working fluid chamber and a working fluid outlet conduit leading from the said working fluid outlet channel to the said tank, a third working fluid chamber disposed in the said housing and opening into the said working fluid diverting conduit, the said first actuator opening into the said last-mentioned chamber to act upon the said shut-off valve in accordance with the working fluid pressure variations prevailing in the said diverting conduit.

5. An automatic differential hydraulic regulating device to act upon the volumetric admission of fluid under pressure in a servo-motor, comprising a first cylinder, a hollow piston in said first cylinder, said hollow piston forming a reciprocating second cylinder, a stationary second piston received by said reciprocating second cylinder of the first piston, a fluid tank, a fluid pressure generator having constant volumetric output, a first working fluid conduit leading from the said tank through the said generator into the said second cylinder for feeding pressure fluid from said generator to the said second cylinder, a fluid diverting conduit leading from the said second cylinder to the said tank, first valve means disposed in the said diverting conduit and adapted to shut off the latter, an exhaust fluid conduit leading from the exhaust end of the said first cylinder to the said tank, second valve means disposed in the said exhaust fluid conduit and adapted to shut off the latter partially only, a first connecting fluid conduit leading from the working end of the said first cylinder normally to the said tank, a second working fluid conduit, a second connecting fluid conduit leading from the said first working fluid conduit to the said second working fluid conduit, third valve means disposed in the said first connecting fluid conduit and adapted to connect the latter to the tank and to the said second connecting fluid conduit, respectively, first means responsive above a predetermined pressure in the said exhaust fluid conduit for opening the said first valve means in the diverting conduit and to connect the latter to the tank, second means responsive above a predetermined pressure in the said diverting conduit for closing the said second valve means in the said exhaust fluid conduit, and third means responsive above a predetermined pressure in the said diverting conduit for operation of the said third valve means and, thereby, to connect the working side of the said first cylinder to the said working fluid conduit and the tank, respectively, depending upon the pressure in the said diverting conduit.

6. The device, as set forth in claim 1, which includes a helical spring disposed in the said cylinder on the working side of the said piston, in order to accelerate the working speed of the said piston.

7. The device, as set forth in claim 1, which includes a third pressure-responsive means secured to the said first valve means and responsive to the pressure difference between the pressure in the said diverting conduit and that in the said exhaust conduit.

GASTON MATHEYS.

REFERENCES CITED

The following references are of record in the file of this patent:

UNITED STATES PATENTS

| Number | Name | Date |
|---|---|---|
| 1,964,196 | Cuttat | June 26, 1934 |
| 2,071,781 | Douglas | Feb. 23, 1937 |
| 2,160,920 | Strawn | June 6, 1939 |
| 2,303,946 | Miller | Dec. 1, 1942 |
| 2,328,979 | Herman et al. | Sept. 7, 1943 |
| 2,328,980 | Herman et al. | Sept. 7, 1943 |

FOREIGN PATENTS

| Number | Country | Date |
|---|---|---|
| 373,732 | Great Britain | June 2, 1932 |